United States Patent
Lee et al.

(10) Patent No.: US 8,541,990 B2
(45) Date of Patent: Sep. 24, 2013

(54) POWER CONVERSION CONTROLLER HAVING A NOVEL POWER FACTOR CORRECTION MECHANISM USING LINE VOLTAGE NORMALIZATION

(75) Inventors: Ko-Yen Lee, Taipei (TW); Chia-Chieh Hung, Taipei (TW); Wei-Chuan Su, Taipei (TW)

(73) Assignee: Immense Advance Technology Corp., Taipei (TW)

( * ) Notice: Subject to any disclaimer, the term of this patent is extended or adjusted under 35 U.S.C. 154(b) by 326 days.

(21) Appl. No.: 12/953,219

(22) Filed: Nov. 23, 2010

(65) Prior Publication Data

US 2012/0126759 A1    May 24, 2012

(51) Int. Cl.
*G05F 1/70* (2006.01)
*G05F 5/00* (2006.01)

(52) U.S. Cl.
USPC .......................................... 323/207; 323/299

(58) Field of Classification Search
USPC ................. 323/205, 207, 284, 299, 300, 222, 323/223
See application file for complete search history.

(56) References Cited

U.S. PATENT DOCUMENTS

| | | | |
|---|---|---|---|
| 7,102,340 B1 * | 9/2006 | Ferguson | 323/284 |
| 7,202,641 B2 * | 4/2007 | Claessens et al. | 323/222 |
| 7,205,749 B2 * | 4/2007 | Hagen et al. | 323/222 |
| 8,237,372 B2 * | 8/2012 | Hoogzaad et al. | 315/291 |
| 2009/0153113 A1 * | 6/2009 | Zilberberg | 323/282 |
| 2009/0189587 A1 * | 7/2009 | Wei | 323/290 |

* cited by examiner

*Primary Examiner* — Bao Q Vu
*Assistant Examiner* — Zekre Tsehaye
(74) *Attorney, Agent, or Firm* — Ming Chow; Sinorica, LLC

(57) ABSTRACT

A power conversion controller having a novel power factor correction mechanism, including: a normalization unit, used to generate a normalized signal according to a line voltage by multiplying the line voltage with a normalizing gain, wherein the normalizing gain is proportional to the reciprocal of the amplitude of the line voltage; a reference current generation unit, coupled to the normalization unit to generate a reference current signal by performing an arithmetic operation, wherein the arithmetic operation involves the normalized signal; and a gate drive signal generation unit, used to generate a gate drive signal, wherein the duty of the gate drive signal is determined by a voltage comparison of the reference current signal and a current sensing signal.

4 Claims, 4 Drawing Sheets

US 8,541,990 B2

POWER CONVERSION CONTROLLER HAVING A NOVEL POWER FACTOR CORRECTION MECHANISM USING LINE VOLTAGE NORMALIZATION

BACKGROUND OF THE INVENTION

1. Field of the Invention

The present invention relates to a power conversion controller, and more particularly to a power conversion controller capable of providing power factor correction for power conversion applications requiring load current regulation.

2. Description of the Related Art

FIG. 1 illustrates a power conversion application, in which a prior art controller 100 having a power factor correction mechanism is used to control a power conversion circuit 110 such that the waveform of an input current $I_{IN}$ of the power conversion circuit 110 is analog to that of a line voltage $V_{LINE}$, and the average of the input current $I_{IN}$ is regulated to result in a DC output voltage $V_O$ for a load 120. As can be seen in FIG. 1, the controller includes a combiner 101, an amplifier 102, a multiplier 103, and a gate drive signal generation unit 104.

The combiner 101 is used to generate an error signal by subtracting $V_O$ with a reference voltage $V_{REF}$. The amplifier 102, having a high DC gain and a cutoff frequency below 120 $H_z$, is used to amplify the error signal with a negative gain to generate an amplitude adjusting signal A.

The multiplier 103 is used to multiply the line voltage $V_{LINE}$ with the amplitude adjusting signal A to generate a reference current signal $S_{REFC}$.

The gate drive signal generation unit 104 is used to generate a gate drive signal $V_G$ to control the switching of the power conversion circuit 110, wherein the duty of the gate drive signal $V_G$ is determined according to a voltage comparison of the reference current signal $S_{REFC}$ and a current sensing signal $S_{CS}$, which represents the input current $I_{IN}$.

When in operation, the current sensing signal $S_{CS}$ will follow the reference current signal $S_{REFC}$, and the negative feedback mechanism will force $V_O$ to approach $V_{REF}$. As such, if the line voltage $V_{LINE}$ is changed to a higher/lower level, the amplitude of the reference current signal $S_{REFC}$ will be adjusted by the amplitude adjusting signal A to a smaller/larger value to result in a lower/higher level of the current sensing signal $S_{CS}$ so as to regulate $V_O$ at $V_{REF}$. That is, the reference current signal $S_{REFC}$, of which the waveform is analog to that of the line voltage $V_{LINE}$, and of which the amplitude is equal to the product of the amplitude adjusting signal A and the amplitude of the line voltage $V_{LINE}$, is the key signal for achieving power factor correction and output voltage regulation at the same time.

However, there is a major disadvantage in this architecture—the amplifier 102 occupies a large area due to the required high gain and low cut-off frequency.

In view of this problem, the present invention proposes a power conversion controller having a novel power factor correction mechanism for power conversion applications.

SUMMARY OF THE INVENTION

The major objective of the present invention is to propose a power conversion controller having a novel power factor correction mechanism for a power conversion circuit, which can be of buck type, buck-boost type, or boost type etc.

To achieve the foregoing objective of the present invention, a power conversion controller having a novel power factor correction mechanism is proposed, the power conversion controller including:

a normalization unit, used to generate a normalized signal according to a line voltage by multiplying the line voltage with a normalizing gain, wherein the normalizing gain is proportional to the reciprocal of the amplitude of the line voltage;

a reference current generation unit, coupled to the normalization unit to generate a reference current signal by performing an arithmetic operation, wherein the arithmetic operation involves the normalized signal; and a gate drive signal generation unit, used to generate a gate drive signal, wherein the duty of the gate drive signal is determined by a voltage comparison of the reference current signal and a current sensing signal.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 1:
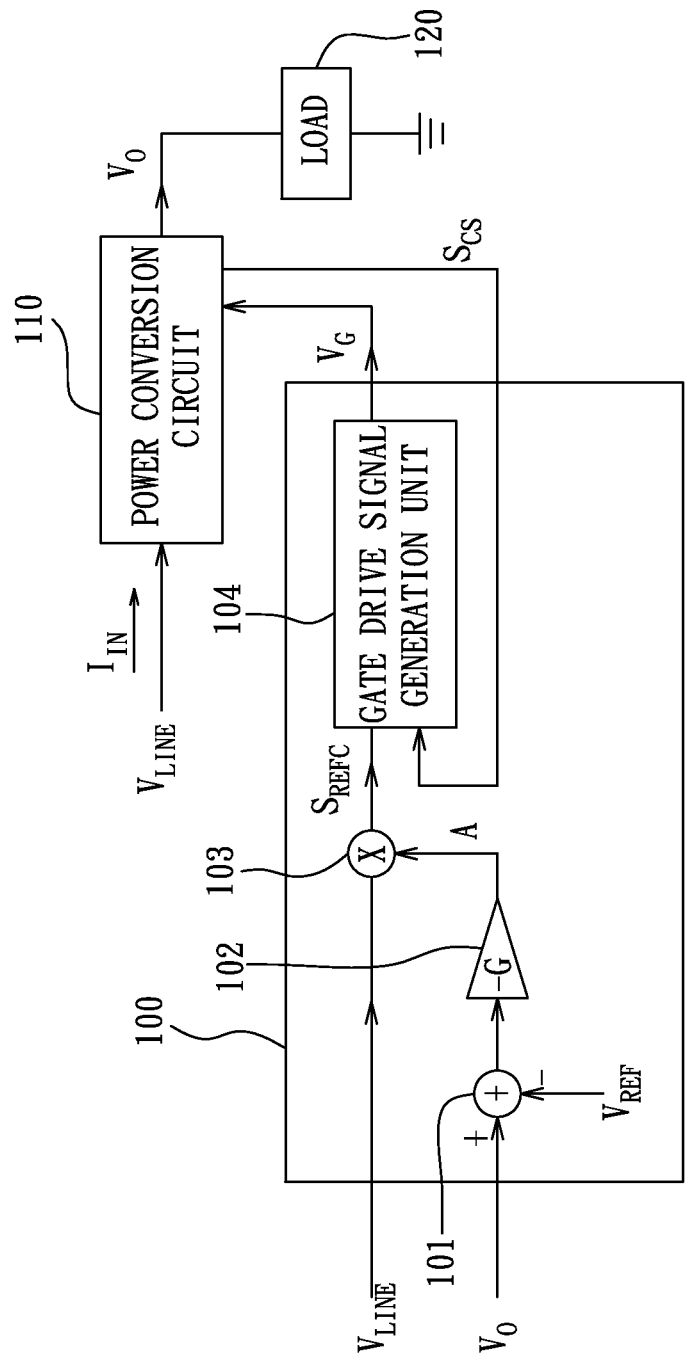
FIG. 1 illustrates a power conversion application, in which a prior art controller having a power factor correction mechanism is used to control a power conversion circuit such that the waveform of an input current is analog to that of a line voltage, and the average of the input current is regulated to result in a DC output voltage for a load.
Figure 2:
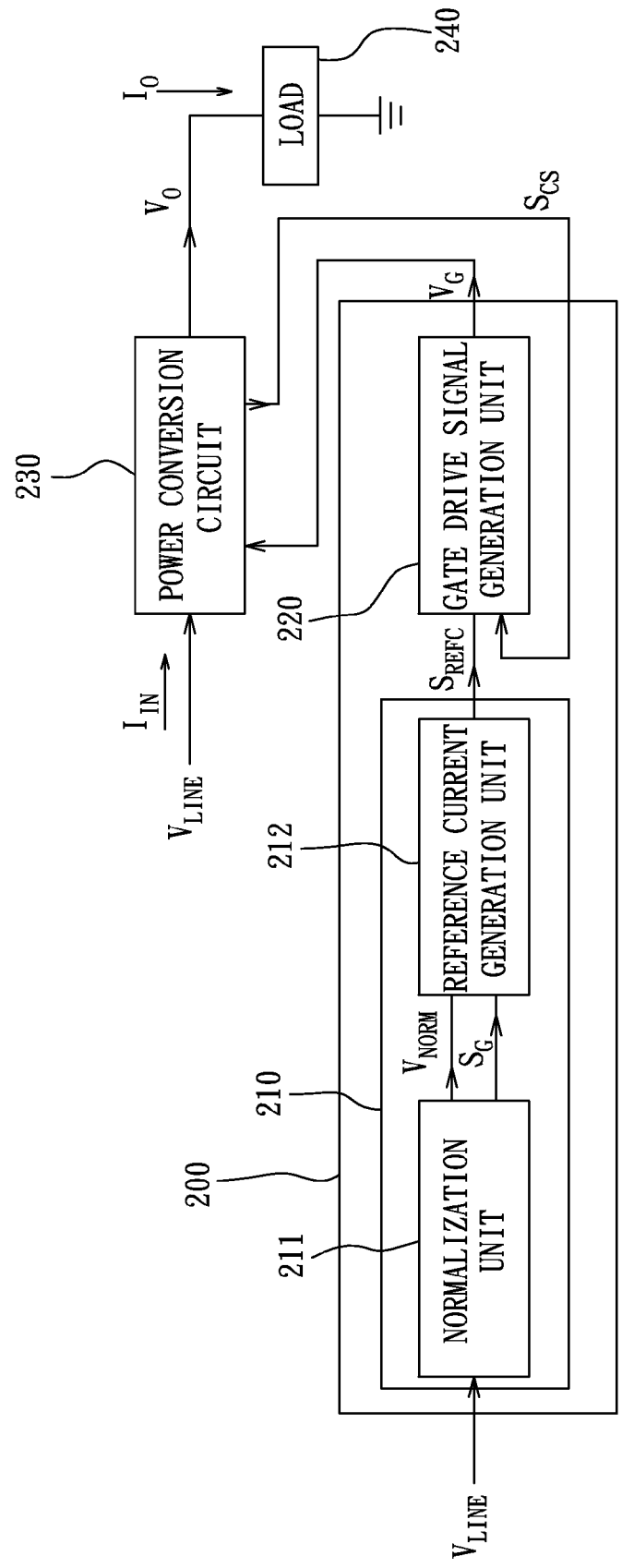
FIG. 2 illustrates a power conversion application, in which a controller having a novel power factor correction mechanism according to a preferred embodiment of the present invention is used to control a power conversion circuit, such that the waveform of an input current is analog to a line voltage, and the average of the output current is regulated according to a constant level.

Please refer to FIG. 2, which illustrates a power conversion application, in which a controller 200 having a novel power factor correction mechanism according to a preferred embodiment of the present invention is used to control a power conversion circuit 230, such that the waveform of an input current $I_{IN}$ is analog to a line voltage $V_{LINE}$, and the average of the output current $I_O$ is regulated according to a constant level to supply a load 240 with a corresponding output voltage $V_O$. As can be seen in FIG. 2, the controller 200 includes a reference current signal generation module 210—having a normalization unit 211 and a reference current generation unit 212—and a gate drive signal generation unit 220.

The normalization unit 211 is used to generate a normalized signal $V_{NORM}$ according to the line voltage $V_{LINE}$ by multiplying the line voltage $V_{LINE}$ with a normalizing gain $S_G$, wherein the normalizing gain $S_G$ is proportional to the reciprocal of the amplitude of the line voltage $V_{LINE}$. The normalization unit 211 can utilize, for example but not limited to, an auto gain control mechanism to implement the equation: $V_{NORM}=V_{LINE} \times S_G$, wherein $S_G$ is derived through an adjusting process such that the amplitude of $V_{NORM}$ is constant irrespective of different amplitudes of $V_{LINE}$.

The reference current generation unit 212 is coupled to the normalization unit 211 to generate a reference current signal $S_{REFC}$ by performing an arithmetic operation, wherein the arithmetic operation, which involves the normalized signal $V_{NORM}$, can be one selected from the group consisting of $S_{REFC}=V_{NORM} \times S_G$, $S_{REFC}=V_{NORM}$, $S_{REFC}=V_{NORM} \times V_{NORM}$, $S_{REFC}=V_{NORM} \times (V_{NORM}+V_O \times S_G)$, and $S_{REFC}=V_{NORM} \times (V_O \times S_G)$.

The gate drive signal generation unit 220 is used to generate a gate drive signal $V_G$, wherein the duty of the gate drive signal $V_G$ is determined by a voltage comparison of the reference current signal $S_{REFC}$ and a current sensing signal $S_{CS}$.

For different types of power converter in different operation modes, different forms of the arithmetic operation involving the normalized signal $V_{NORM}$ can be used, and, during the voltage comparison process, the reference current signal $S_{REFC}$ can be used as a peak reference current to determine the peak value of the current sensing signal $S_{CS}$, or used as an average reference current to determine the average value of the current sensing signal $S_{CS}$.

Figure 3:
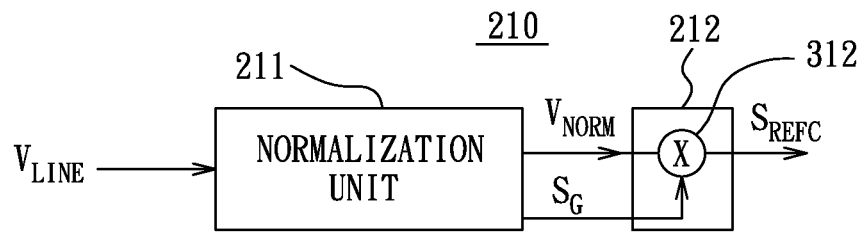
FIG. 3 illustrates the block diagram of a reference current signal generation module in FIG. 2 according to a preferred embodiment of the present invention.

For example, if the power conversion application is a boundary current mode boost convertor, then the reference current signal generation module 210 can be implemented with the circuit block illustrated in FIG. 3, which includes a normalization unit 211 and a multiplier 312 to realize the equation $S_{REFC}=V_{NORM} \times S_G$. The reference current signal $S_{REFC}$ so designed can render a constant average output current and an excellent power factor in the meantime for this type of application. The principle is elaborated as follows:

With $V_{LINE}$ expressed as $V_A \sin \theta$, $0°<\theta<180°$ for a cycle of the full-wave rectified line voltage $V_{LINE}$, and the switching frequency of $V_G$ is much higher than that of $V_{LINE}$, by employing $S_{REFC}=V_{NORM} \times S_G$ as a peak reference current, during one switching cycle, the input power can be expressed as $V_{LINE} \times I_{IN,avg} = V_{LINE} \times S_{REFC}/2 = V_{LINE} \times V_{NORM} \times S_G/2 = V_{NORM} \times V_{NORM}/2 = (K \sin \theta)^2/2$, wherein $I_{IN,avg}$ represents the average of the input current $I_{IN}$, $S_G=K/V_A$, and K is a constant; and the average output current $I_{O,avg}$ can be expressed as $I_{O,avg}=(S_{REFC}/2) \times t_{OFF}/(t_{ON}+t_{OFF})=(S_{REFC}/2) \times V_{LINE}/V_O=(V_{NORM} \times S_G/2) \times V_{LINE}/V_O=(V_{NORM})^2/2V_G=(K \sin \theta)^2/2V_O$, wherein $t_{ON}$ is the active period of $V_G$ and $t_{OFF}$ is the inactive period of $V_G$. As such, the input current $I_{IN}$ is in phase with the line voltage $V_{LINE}$, and the average output current over the cycle of the full-wave rectified line voltage $V_{LINE}$ is independent of the amplitude of $V_{LINE}$.

Figure 4:
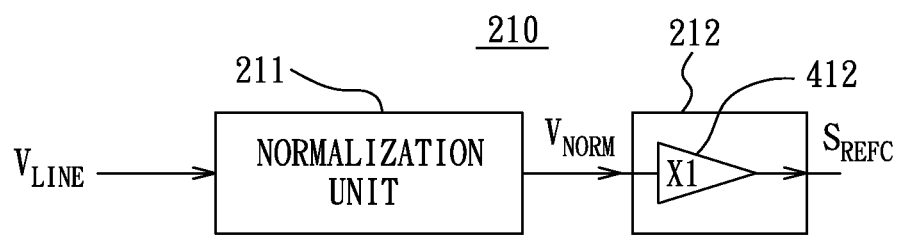
FIG. 4 illustrates the block diagram of a reference current signal generation module in FIG. 2 according to another preferred embodiment of the present invention.

Further, if the power conversion application is a discontinuous current mode fixed frequency flyback convertor, then the reference current signal generation module 210 can be implemented with the circuit block illustrated in FIG. 4, which includes a normalization unit 211 and a buffer 412 to realize the equation $S_{REFC}=V_{NORM}$. The reference current signal $S_{REFC}$ so designed can render a constant average output current and an excellent power factor in the meantime for this type of application. The principle is elaborated as follows:

With $V_{LINE}$ expressed as $V_A \sin \theta$, $0°<\theta<180°$ for a cycle of the full-wave rectified line voltage $V_{LINE}$, and the switching frequency of $V_G$ is much higher than that of $V_{LINE}$, by employing $S_{REFC}=V_{NORM}$ as a peak reference current, during one switching cycle, the input power can be expressed as $V_{LINE} \times I_{IN,avg} = L(S_{REFC})^2/2T = L(V_{NORM})^2/2T = L(K \sin \theta)^2/2T$, wherein $I_{IN,avg}$ represents the average of the input current $I_{IN}$, L is the inductance of an inductor, K is a constant and T is the switching cycle period; and the average output current $I_{O,avg}$ can be expressed as $I_{O,avg}=P_{IN}/V_O=L(K \sin \theta)^2/2TV_O$, wherein $P_{IN}$ is the input power. As such, the input current is in phase with the line voltage $V_{LINE}$, and the average output current over the cycle of the full-wave rectified line voltage $V_{LINE}$ is independent of the amplitude of $V_{LINE}$. It is to be noted that the buffer 412 can be replaced with another equivalent circuit—a feedthrough connection for example.

Figure 5:
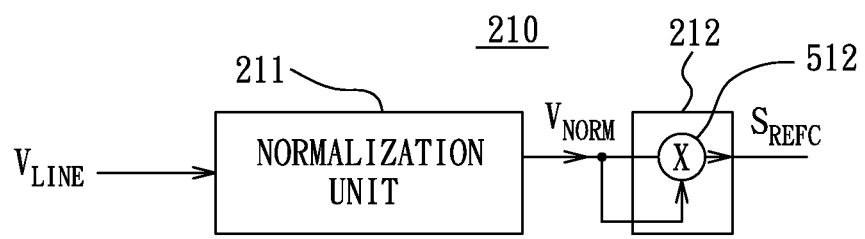
FIG. 5 illustrates the block diagram of a reference current signal generation module in FIG. 2 according to still another preferred embodiment of the present invention.

Still further, if the power conversion application is a buck convertor or a forward convertor considered as a primary side equivalent circuit, then the reference current signal generation module 210 can be implemented with the circuit block illustrated in FIG. 5, which includes a normalization unit 211 and a multiplier 512 to realize the equation $S_{REFC}=V_{NORM} \times V_{NORM}$. The reference current signal $S_{REFC}$ so designed can render a constant average output current and an excellent power factor in the meantime for this type of application, and what is more, since the average output current will be independent of the output voltage, the design is especially suitable for a LED lighting application, of which the output voltage can vary a lot due to the spec variation of LEDs. The principle is elaborated as follows:

With $V_{LINE}$ expressed as $V_A \sin \theta$, $0°<\theta<180°$ for a cycle of the full-wave rectified line voltage $V_{LINE}$, and the switching frequency of $V_G$ is much higher than that of $V_{LINE}$, by employing $S_{REFC}=V_{NORM} \times V_{NORM}$ as a peak reference current for boundary current mode operation, during one switching cycle, the input power can be expressed as $V_{LINE} \times I_{IN,avg}=V_{LINE} \times ((S_{REFC}/2) \times t_{OFF}/(t_{ON}+t_{OFF}))=V_{LINE} \times ((S_{REFC}/2) \times V_O/V_{LINE})=(V_{NORM})^2 \times V_O/2=V_O(K \sin \theta)^2/2$, wherein $I_{IN,avg}$ represents the average of the input current $I_{IN}$, $t_{ON}$ is the active period of $V_G$, $t_{OFF}$ is the inactive period of $V_G$, and K is a constant; and the average output current $I_{O,avg}$ can be expressed as $I_{O,avg}=S_{REFC}/2=(V_{NORM})^2/2=(K \sin \theta)^2/2$.

As for continuous current mode, by employing $S_{REFC}=V_{NORM} \times V_{NORM}$ as an average reference current, during one switching cycle, the input power can be expressed as $V_{LINE} \times I_{IN,avg}=V_{LINE} \times (S_{REFC} \times V_O/V_{LINE})=(V_{NORM})^2 \times V_O=V_O(K \sin \theta)^2$, wherein $I_{IN,avg}$ represents the average of the input current $I_{IN}$, and K is a constant; and the average output current $I_{O,avg}$ can be expressed as $I_{O,avg}=S_{REFC}=(V_{NORM})^2=(K \sin \theta)^2$. As such, the input current is in phase with the line voltage $V_{LINE}$, and the average output current over the cycle of the full-wave rectified line voltage $V_{LINE}$ is independent of the amplitude of $V_{LINE}$ and $V_O$.

Figure 6:
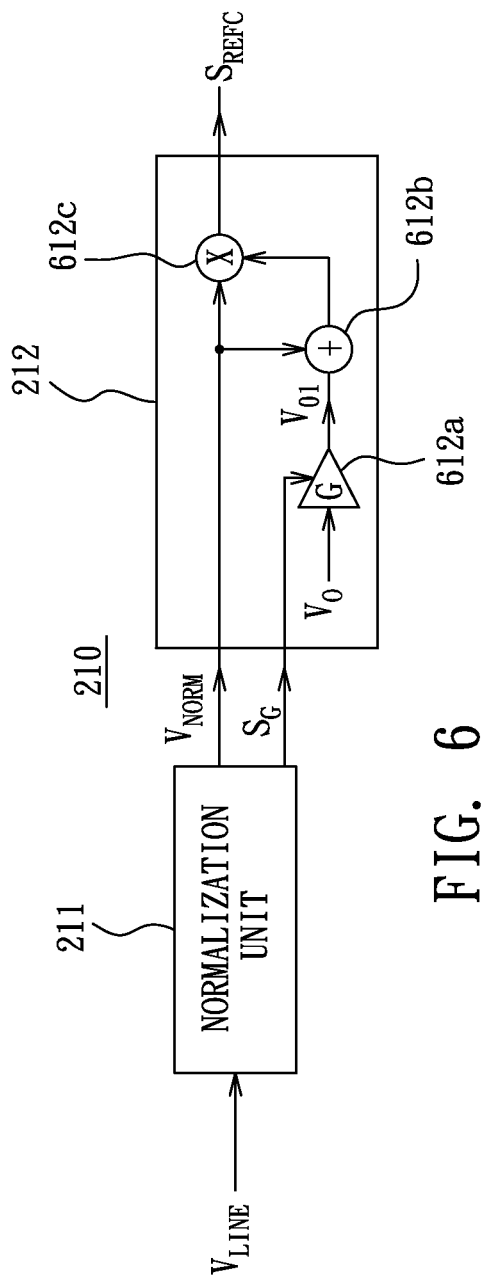
FIG. 6 illustrates the block diagram of a reference current signal generation module in FIG. 2 according to still another preferred embodiment of the present invention.

Still further, if the power conversion application is a buck-boost convertor or a flyback convertor considered as a primary side equivalent circuit, then the reference current signal generation module 210 can be implemented with the circuit block illustrated in FIG. 6, which includes a normalization unit 211, a variable gain amplifier 612a, a combiner 612b, and a multiplier 612c to realize the equation $S_{REFC}=V_{NORM} \times (V_{NORM}+V_O \times S_G)$. The reference current signal $S_{REFC}$ so designed can render a constant average output current and an excellent power factor in the meantime for this type of application, and what is more, since the average output current will be independent of the output voltage, the design is especially suitable for a LED lighting application, of which the output voltage can vary a lot due to the spec variation of LEDs. The principle is elaborated as follows:

With $V_{LINE}$ expressed as $V_A \sin\theta$, $0° < \theta < 180°$ for a cycle of the full-wave rectified line voltage $V_{LINE}$, and the switching frequency of $V_G$ is much higher than that of $V_{LINE}$, by employing $S_{REFC} = V_{NORM} \times (V_{NORM} + V_O \times S_G)$ as a peak reference current for boundary current mode operation, during one switching cycle, the input power can be expressed as $V_{LINE} \times I_{IN,avg} = V_{LINE} \times ((S_{REFC}/2) \times V_O/(V_{LINE} + V_O)) = (V_{NORM})^2/2 \times V_O = V_O(K \sin\theta)^2/2$, wherein $I_{IN,avg}$ represents the average of the input current $I_{IN}$, and K is a constant; and the average output current $I_{O,avg}$ can be expressed as $I_{O,avg} = (S_{REFC}/2) \times t_{OFF}/(t_{ON} + t_{OFF})) = (S_{REFC}/2) \times V_{LINE}/(V_O + V_{LINE}) = V_{NORM} \times (V_{NORM} + V_O \times S_G) \times V_{LINE}/(V_O + V_{LINE})/2 = (V_{NORM})^2 2 = (K \sin\theta)^2/2$, wherein $t_{ON}$ is the active period of $V_G$ and $t_{OFF}$ is the inactive period of $V_G$.

As for continuous current mode, by employing $S_{REFC} = V_{NORM} \times (V_{NORM} + V_G \times S_G)$ as an average reference current, during one switching cycle, the input power can be expressed as $V_{LINE} \times I_{IN,avg} = V_{LINE} \times (S_{REFC} \times V_O/(V_{LINE} + V_O)) = (V_{NORM})^2 \times V_O = V_O(K \sin\theta)^2$, wherein $I_{IN,avg}$ represents the average of the input current $I_{IN}$, and K is a constant; and the average output current $I_{O,avg}$ can be expressed as $I_{O,avg} = S_{REFC} \times t_{OFF}/(t_{ON} + t_{OFF})) = S_{REFC} \times V_{LINE}/(V_O + V_{LINE}) = V_{NORM} \times (V_{NORM} + V_O \times S_G) \times V_{LINE}/(V_O + V_{LINE}) = (V_{NORM})^2 = (K \sin\theta)^2$, wherein $t_{ON}$ is the active period of $V_G$ and $t_{OFF}$ is the inactive period of $V_G$. As such, the input current is in phase with the line voltage $V_{LINE}$, and the average output current over the cycle of the full-wave rectified line voltage $V_{LINE}$ is independent of the amplitude of $V_{LINE}$ and $V_O$.

Figure 7:
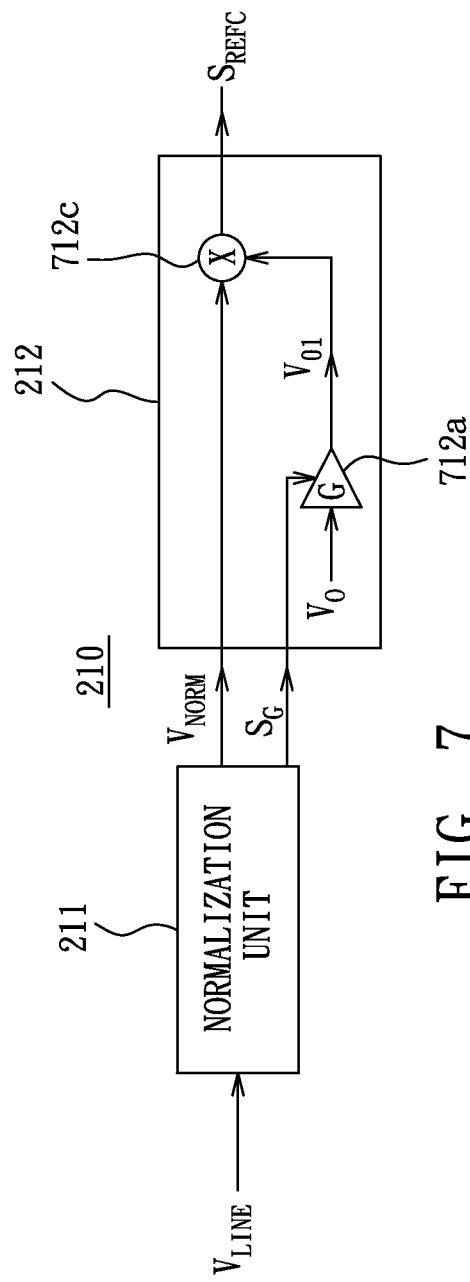
FIG. 7 illustrates the block diagram of a reference current signal generation module in FIG. 2 according to still another preferred embodiment of the present invention.

Still further, if the power conversion application is a boost convertor, then the reference current signal generation module 210 can be implemented with the circuit block illustrated in FIG. 7, which includes a normalization unit 211, a variable gain amplifier 712a, and a multiplier 712c to realize the equation $S_{REFC} = V_{NORM} \times (V_O \times S_G)$. The reference current signal $S_{REFC}$ so designed can render a constant average output current and an excellent power factor in the meantime for this type of application, and what is more, since the average output current will be independent of the output voltage, the design is especially suitable for a LED lighting application, of which the output voltage can vary a lot due to the spec variation of LEDs. The principle is elaborated as follows:

With $V_{LINE}$ expressed as $V_A \sin\theta$, $0° < \theta < 180°$ for a cycle of the full-wave rectified line voltage $V_{LINE}$, and the switching frequency of $V_G$ is much higher than that of $V_{LINE}$, by employing $S_{REFC} = V_{NORM} \times (V_O \times S_G)$ as a peak reference current for boundary current mode operation, during one switching cycle, the input power can be expressed as $V_{LINE} \times I_{IN,avg} = V_{LINE} \times S_{REFC} = V_{LINE} \times V_{NORM} \times (V_O \times S_G) = (V_{NORM})^2 \times V_O = V_O(K \sin\theta)^2$, wherein $I_{IN,avg}$ represents the average of the input current $I_{IN}$, and K is a constant; and the average output current $I_{O,avg}$ can be expressed as $I_{O,avg} = (S_{REFC}/2) \times t_{OFF}/(t_{ON} + t_{OFF}) = (S_{REFC}/2) \times V_{LINE}/V_O = V_{NORM} \times (V_O \times S_G) \times V_{LINE}/V_O/2 = (V_{NORM})^2/2 = (K \sin\theta)^2/2$, wherein $t_{ON}$ is the active period of $V_G$ and $t_{OFF}$ is the inactive period of $V_G$.

As for continuous current mode, by employing $S_{REFC} = V_{NORM} \times (V_O \times S_G)$ as an average reference current, during one switching cycle, the input power can be expressed as $V_{LINE} \times I_{IN,avg} = V_{LINE} \times S_{REFC} = V_{LINE} \times V_{NORM} \times (V_O \times S_G) = (V_{NORM})^2 \times V_O = V_O(K \sin\theta)^2$, wherein $I_{IN,avg}$ represents the average of the input current $I_{IN}$, and K is a constant; and the average output current $I_{O,avg}$ can be expressed as $I_{O,avg} = S_{REFC} \times t_{OFF}/(t_{ON} + t_{OFF}) = S_{REFC} \times V_{LINE}/V_O = V_{NORM} \times (V_O \times S_G) \times V_{LINE}/V_O = (V_{NORM})^2 = (K \sin\theta)^2$, wherein $t_{ON}$ is the active period of $V_G$ and $t_{OFF}$ is the inactive period of $V_G$. As such, the input current is in phase with the line voltage $V_{LINE}$, and the average output current over the cycle of the full-wave rectified line voltage $V_{LINE}$ is independent of the amplitude of $V_{LINE}$ and $V_O$.

As can be seen from the specification above, by using the power conversion controller of the present invention having a normalization unit for processing a line voltage, a novel power factor correction mechanism for power converters of buck type, buck-boost type, boost type, fly-back type, etc. is proposed, and the large error amplifier needed in prior art is eliminated. Therefore, the present invention does improve the prior art controllers and is worthy of being granted a patent.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A power conversion controller having a novel power factor correction mechanism, comprising:
    a normalization unit, using an auto gain control mechanism to generate a normalized signal and a normalizing gain according to a line voltage, wherein said normalized signal is equal to a product of said line voltage and said normalizing gain, and said normalizing gain is proportional to a reciprocal of an amplitude of said line voltage,
    a reference current generation unit, coupled to said normalization unit to generate a reference current signal by performing an arithmetic operation, wherein said arithmetic operation involves said normalized signal wherein said reference current generation unit implements selecting said arithmetic operation from a group that includes both $S_{REFC} = V_{NORM} \times S_G$ and $S_{REFC} = V_{NORM}$, wherein $S_{REFC}$ represents said reference current signal, $V_{NORM}$ represents said normalized signal, and $S_G$ represents said normalizing gain; and
    a gate drive signal generation unit, used to generate a gate drive signal, wherein a duty of said gate drive signal is determined by a voltage comparison of said reference current signal and a current sensing signal.

2. The power conversion controller having a novel power factor correction mechanism as claim 1, wherein the group also includes the arithmetic operation $S_{REFC} = V_{NORM} \times V_{NORM}$.

3. The power conversion controller having a novel power factor correction mechanism as claim 1, wherein the group also includes the arithmetic operation $S_{REFC} = V_{NORM} \times (V_{NORM} + V_O \times S_G)$, wherein $V_O$ represents an output voltage.

4. The power conversion controller having a novel power factor correction mechanism as claim 1, wherein the group also includes the arithmetic operation $S_{REFC} = V_{NORM} \times (V_O \times S_G)$, wherein $V_O$ represents an output voltage.

* * * * *